United States Patent [19]

Leigh

[11] 3,857,889

[45] Dec. 31, 1974

[54] ISOLATION PROCESS

[75] Inventor: Thomas Leigh, Macclesfield, England

[73] Assignee: Imperial Chemical Industries Limited, London, England

[22] Filed: May 26, 1969

[21] Appl. No.: 827,966

[30] Foreign Application Priority Data

Aug. 6, 1968 Great Britain.................... 37523/68

[52] U.S. Cl....... 260/570.7, 260/306.7, 260/501.18, 260/520, 260/558 R
[51] Int. Cl............................................ C07c 93/06
[58] Field of Search..................... 260/570.7, 501.18

[56] References Cited
UNITED STATES PATENTS

| | | | |
|---|---|---|---|
| 2,650,938 | 9/1953 | Gero................................ | 260/570.6 |
| 2,734,919 | 2/1956 | Amiard............................ | 260/570.6 |
| 3,167,566 | 1/1965 | Overby.......................... | 260/570.9 X |
| 3,250,803 | 5/1966 | Dijk et al...................... | 260/570.6 X |
| 3,405,159 | 10/1968 | Krieger et al................ | 260/570.6 X |

FOREIGN PATENTS OR APPLICATIONS

| | | | |
|---|---|---|---|
| 1,069,343 | 5/1967 | Great Britain.................. | 260/570.7 |
| 356,931 | 9/1931 | Great Britain.................. | 260/570.6 |

*Primary Examiner*—Robert V. Hines
*Attorney, Agent, or Firm*—Cushman, Darby & Cushman

[57] ABSTRACT

A general process for the isolation of an enantiomer present in excess in a partially resolved mixture of enantiomers of an organic compound, which forms a racemic compound, comprising treating the mixture with a crystallisation solvent and a solubilising agent whereby only the enantiomer present in excess passes into solution and is thereby separated from the insoluble racemic compound.

4 Claims, No Drawings

ISOLATION PROCESS

This invention relates to an isolation process, and more particularly it relates to a process for the isolation of one enantiomer from a mixture of a pair of enantiomers.

It is well-known that an organic compound which contains an asymmetric carbon atom can exist in two optically active forms or enantiomers, and that such a compound is often obtained in the form of a mixture containing equal amounts of the two enantiomers. It is often the case that the two enantiomers interact to form a racemic compound, and the formation of such a racemic compound can be detected by examination of the phase-composition diagram which should show a peak corresponding to a mixture of equal amounts of the two enantiomers.

The present invention relates to a process for the isolation of one enantiomer from a mixture of that enantiomer and the corresponding racemic compound (hereinafter referred to as a partially resolved mixture), and such an isolation process is of considerable importance when, for example, the organic compound in question possesses biological activity which makes it useful as a drug and the activity of the enantiomers is sufficiently different for it to be desirable to use only one of the enantiomers for administration to humans.

It is known that one enantiomer may sometimes be isolated from a partially resolved mixture, as hereinbefore defined, by a simple crystallisation of that mixture from a suitable solvent, but this method is not of general application. It has now been found that by the application of the process of this invention, the solubilities of the enantiomer and racemic compound may be made to differ considerably so that a separation may be achieved, and that this process is of general application.

According to the invention there is provided a process for the isolation, in a substantially optically pure form, of an enantiomer present in excess in a partially resolved mixture, which comprises interacting the said partially resolved mixture with a crystallisation solvent in the presence of a solubilising agent, and then recovering the enantiomer from the solution so obtained.

In a practical embodiment of the process, the crystallisation solvent and the solubilising agent are different entities, but under certain circumstances, the crystallisation solvent may be the same as the solubilising agent. In this context, the term "crystallisation solvent" means a solvent in which the racemic compound is only sparingly soluble when cold, but does not necessarily imply that the solubility of the racemic compound is much greater when the solvent is hot. For relatively polar compounds, suitable crystallisation solvents are, for example relatively non-polar solvents, for example petrol, cyclohexane, benzene or toluene.

The process of the invention may be carried out by extracting a partially resolved mixture in the solid or semi-solid state with the crystallisation solvent in the presence of the solubilising agent so that the enantiomer in excess passes into solution and the racemic compound is left undissolved. Alternatively, the process may be carried out by cooling a hot solution of the partially resolved mixture in the crystallisation solvent in the presence of the solubilising agent, so that the racemic compound separates from the solution. In each case, the enantiomer originally present in excess is obtained in solution, and may be isolated by filtration of the solution from the undissolved racemic compound, followed by recovery of the enantiomer from the filtrate, for example by evaporation and crystallisation of the residue.

The nature of the preferred solubilising agent varies with the chemical structure of the enantiometer being isolated, but the following classes of compounds are examples of suitable solubilsing agents, primary amines, secondary amines, alcohols, phenols or ketones. Of these classes, primary aralkylamines, especially those of 7–10 carbon atoms, lower aliphatic primary or secondary amines, especially those in which the aliphatic radical is saturated or unsaturated and is of 1–6 carbon atoms, heterocyclic amines, especially saturated 5- or 6-membered N-containing heterocyclic compounds optionally containing an oxygen atom in the ring, and lower aliphatic alcohols, especially saturated and unsaturated aliphatic alcohols of up to 6 carbon atoms. Examples of particularly useful solubilising agents are benzylamine, t-butylamine, allylamine, morpholine, n-butanol, s-butanol and allyl alcohol.

When used together with a crystallisation solvent, the amount of solubilising agent necessary to produce a satisfactory isolation depends upon the nature of the enantiomer, and a wide variation in the molecular ratio of solubilising agent to enantiomer is possible, for example ratios from 2 to 20 may be employed.

The process of the invention is applicable to any organic compound which forms a racemic compound (as hereinbefore defined), and which can be obtained in the form of a partially resolved mixture. Such a partially resolved mixture may be obtained by any conventional method, for example an equimolar mixture of enantiomers may be treated with another optically active compound to form a pair of diastereoisomers which can be separated, at least in part, by fractional crystallisation, or a partially resolved mixture of an intermediate may be modified chemically to give a partially resolved mixture of the required starting material.

Examples of suitable compounds to which the process of the invention can be applied are 1-alkylamino-3-(aryloxy)-2-propanols which possess $\beta$-adrenergic blocking activity and antiarrhythmic activity and which are useful in the treatment of heart diseases, for example 1-isopropylamino-3-(1-naphthoxy)-2-propanol (propranolol), 1-(o-allylphenoxy)-3-isopropylamino-propan-2-ol, or 1-(o-ethoxyphenoxy)-3-isopropylaminopropan-2-ol; 6-substituted-2,3,,5,6-tetrahydroimidazo [2,1-b]thiazoles, particularly tetramisole wherein the 6-substituent is a phenyl radical, which are anthelmintic agents, $\alpha$-methylbenzylamine amides, $\alpha$-ethyl-phenylacetic acid amides and halogenated diphenoxypropionic acids, for example $\alpha$-[4p-chlorophenyl) phenoxy]propionic acid which possesses hypocholesterolaemic activity.

One particularly useful embodiment of the invention comprises a process for the isolation of the useful antiarrhythmic drug, (+)-propranolol, from a partially resolved mixture of the enantiomers of propranolol in which (+)-propranolol is present in excess, by the interaction of the said partially resolved mixture with a non-polar solvent, for example petrol or cyclohexane, in the presence of a solubilising agent selected from primary aralkyl or aliphatic amines, or aliphatic alcohols, for example benzylamine or a primary aliphatic amine of up to 4 carbon atoms, for example t-butylamine or allylamine, or an aliphatic alcohol of up to 4 carbon atoms, for example n-butanol, s-butanol or allyl alcohol, and then recovering the (+)-propranolol from the solution so obtained.

This process may be carried out either by stirring the partially resolved mixture of enantiomers of propranolol with a solution of the solubilisng agent in the non-polar solvent to obtain a solution of the (+)-propranolol, or it may be carried out by cooling a hot solution of the partially resolved mixture in the non-polar solvent together with the solubilising agent so that the racemic compound (+)-propanolol separates to leave the (+)-propanolol in solution from which it may be recovered by any conventional method.

The (+)-propranolol may be obtained in the known manner by the reaction of isopropylamine and 1-chloro-3-(1-naphthoxy)-2-propanol in a sealed vessel at 70°–80°C. for 10 hours, and the partially resolved mixture of the enantiomers of propranolol in which (+)-propranolol is present in excess, may be obtained by the known procedure of fractional crystallisation of the diastereoisomeric salts formed from (+)-propranolol and (−)-0,0-di-p-toluoyltartaric acid or (−)-0,0-dibenzoyltartaric acid, especially the neutral salts.

Another particularly useful embodiment of the invention comprises a process for the isolation of the anthelmintic agent, (−)-tetramisole, from a partially resolved mixture of the enantiomers of tetramisole in which (−)-tetramisole is present in excess, by the interaction of the said partially resolved mixture with a non-polar solvent, for example petrol or cyclohexane, in the presence of an aliphatic amine, for example allylamine, as the solubilising agent, and then recovering the (−)-tetramisole from the solution so obtained.

The (+)-tetramisole may be obtained in the known manner by heated (+)-2-(acetylamino)-3-(α-hydroxy-phenethyl)thiazolidine with thionyl chloride in the presence of acetic anhydride, and the partially resolved mixture of the enantiomers of tetramisole in which the (−)-tetramisole is present in excess, may be obtained by the known procedure of fractional crystallisation of the diastereoisomeric salts formed from (+)-tetramisole and d-camphor-10-sulphonic acid.

The invention is illustrated but not limited by the following Examples:

EXAMPLE 1

50 Grams (0.193 mol.) of a partially resolved mixture of the enantiomers of propranolol in which (+)-propranolol is present in excess [hydrochloride has $[\alpha]_D^{25} + 11.0°$ ($c = 5$, methanol)] are stirred for 1 hour with a solution of 25 ml. of benzylamine (2 mol. per mol. of (+)-propranolol) in 100 ml. of petroleum ether (b.p. 60°–80°C.). The mixture is then filtered to give as the solid residue 27 g. of (+)-propranolol, m.p. 93°C., [hydrochloride has $[\alpha]_D^{25} + 1.0°$ ($c = 5$, methanol)]. The filtrate is evaporated and the residue is triturated with water to remove the benzylamine. A solid residue is left which consists of 22 g. of (+)-propranolol, m.p. 73°C. [hydrochloride has $[\alpha]_D^{25} + 21.4°$ ($c = 5$, methanol)].

The partially resolved mixture used as starting material may be obtained as follows:

A solution of 91 g. (0.35 mol.) of (+)-propranolol in 150 ml. of ethanol is added to a solution of 67.5 g. (0.175 mol.) of (−)-0,0-di-p-toluoyltartaric acid in 150 ml. of ethanol. The mixture is kept at ambient temperature for 24 hours, and then filtered and the solid retained. The filtrate is evaported to dryness, and the residue is stirred with 500 ml. of N-sodium hydroxide solution and 1,000 ml. of diethyl ether. The ethereal phase is separated, washed with water, dried and evaporated to give the partially resolved mixture used in the first part of this Example.

The solid retained above is the neutral (−)-propranolol salt of (−)-0,0-di-p-toluoyltartaric acid, m.p. 82°–85°C., and this may be converted into (−)-propranolol as follows:

The salt is stirred with 500 ml. of N-sodium hydroxide solution and 1,000 ml. of diethyl ether. The ethereal phase is separated, washed with water, dried and evaporated. The residue is crystallised from petroleum ether (b.p. 60°–80°C.) to give (−)-propranolol, m.p. 73°C. [hydrochloride has $[\alpha]_D^{25} − 21.5°$ ($c = 5$, methanol)].

Alternatively, a mixture of 27.6 g. (0.106 mol.) of (+)-propranolol and 10 g. (0.0266 mol.) of (−)-0,0-dibenzoyltartaric acid monohydrate in 110 ml. of ethanol is warmed until a clear solution is obtained, and it is then cooled to ambient temperature and stirred for 24 hours. The solid, which is essentially the neutral (−)-propranolol salt of (−)-0,0-dibenzoyltartaric acid, is filtered off, and the filtrate is evaporated to dryness. The residue is converted into the free base as described above for the corresponding (−)-0,0-di-p-toluoyltartaric acid salt, and there is obtained a partially resolved mixture of the enantiomers of propranolol [hydrochloride has $[\alpha]_D^{25} + 11.3°$ ($c = 5$, methanol)].

EXAMPLE 2

The general process described in the first part of Example 1 can be carried out on a variety of chemical compounds as set out in the table below.

| Compound | Crystallisation Solvent | Solubilising Agent | Molar ratio of solubilising agent to enantiomer | Optical Rotation | | | |
|---|---|---|---|---|---|---|---|
| | | | | Partially resolved mixture | Insoluble solid | Product isolated from solution | Pure isomer |
| Propranolol | 60–80 petrol | t-butylamine | 2 | + 11.3 | + 1.7 | + 21.4 | 21.5 |
| Tetramisole | cyclohexane | allylamine | 3 | − 64 | − 27 | −123 | 125 |
| N-benzoyl-1-phenylethyl-amine | 60–80 petrol | allylamine | 20 | + 22.4 | 0.0 | + 39.3 | 39.9 |
| 1-phenyl-butanoic acid N-phenylamide | 60–80 petrol | t-butylamine | 10 | − 75 | − 55 | − 99 | 105 |

EXAMPLE 3

50 Grams (0.193 mol.) of a partially resolved mixture of the enantiomers of propranolol in which (+)-propranolol is present in excess [hydrochloride has $[\alpha]_D^{25} + 10.8°$ ($c = 5$, methanol)] are added to a mixture of 25 ml. of benzylamine (0.23 mol.) and 1,000 ml. of petroleum ether (b.p. 60°–80°C.). The mixture is boiled, and the clear solution is set aside to crystallise during 12 hours. The mixture is filtered and the residue is (+)-propranolol m.p. 93°C., [hydrochloride has $[\alpha]_D^{25} + 1.0°$ ($c = 5$, methanol)]. The filtrate is evaporated, and the residue is triturated with water to remove the benzylamine. The residue consists of 21 g. of (+)-propranolol [hydrochloride has $[\alpha]_D^{25} + 22°$ ($c = 5$, methanol)].

EXAMPLE 4

5 Grams (0.02 mol.) of a partially resolved mixture of the enantiomers of 1-(o-allylphenoxy)-3-isopropylaminopropan-2-ol in which (+)-1-(o-allylphenoxy)-3-isopropylaminopropan-2-ol is present in excess [hydrochloride has $[\alpha]_D^{25} + 25.7°$ ($c = 5$, methanol)] are added to a mixture of 100 ml. of petroleum ether (b.p. 40°–60°C.) and 2.8 ml. (0.03 mol.) of s-butanol. The mixture is cooled to −50°C. and stirred at this temperature for 1 hour. The mixture is filtered and the residue is (+)-1-(o-allylphenoxy)-3-isopropylaminopropan-2-ol, [hydrochloride has $[\alpha]_D^{25} + 1.2°$ ($c = 5$, methanol)]. The filtrate is evaporated, and the residue is dissolved in 30 ml. of ether, and anhydrous hydrochloric acid is added. The mixture is filtered, and the residue is the hydrochloride of (+)-1-(o-allylphenoxy)-3-isopropylaminopropan-2-ol, $[\alpha]_D^{25}$ ($c = 4$, methanol) +29.9°. The pure isomer has $[\alpha]_D^{25} + 30.3°$ ($c = 4$, methanol).

EXAMPLE 5

67 Grams (0.265 mol.) of a partially resolved mixture of the enantiomers of 1-(o-ethoxyphenoxy)-3-isopropylaminopropan-2-ol in which the (−)-enantiomer is present in excess [hydrochloride has $[\alpha]_D^{25} -1.5°$ ($c = 5$, methanol)] are stirred for 2 hours with a solution of 30 ml. of n-butanol in 300 ml. of petroleum ether (b.p. 60°–80°C.) at 5°C. The mixture is filtered, and the filtrate is evaporated to dryness to obtain a solid residue of 9 g. of (−)-1-(o-ethoxyphenoxy)-3-isopropylaminopropan-2-ol, m.p. 72°C. [hydrochloride has $[\alpha]_D^{25} - 9.3°$ ($c = 5$, methanol)]. The residue is stirred for 1 hour at 5°C. with a solution of 4.5 ml. of n-butanol (3 mol. per mol. of (−)-enantiomer) in 160 ml. of petroleum ether (b.p. 60°–80°C.). The mixture is filtered to give, as the solid residue, 5.2 g. of 1-(o-ethoxyphenoxy)-3-isopropylaminopropan-2-ol [hydrochloride has $[\alpha]_D^{25} - 3.0°$ ($c = 5$, methanol). The filtrate is evaporated to dryness to obtain 3.0 g. of (−)-(1-o-ethoxyphenoxy)-3-isopropylaminopropan-2-ol m.p. 73°C. [hydrochloride has $[\alpha]_D^{25} - 17.0°$ ($c = 5$, methanol)].

The partially resolved mixture used as starting material may be obtained as follows:

A mixture of 121.5 g. of (+)-1-(o-ethoxyphenoxy)-3-isopropylaminopropan-2-ol (0.48 mol.), 185 g. of (−)-0,0-di-p-toluoyltartaric acid (0.48 mol.) and 300 ml. of ethanol is warmed to 50°C. to obtain a clear solution. The solution is cooled to ambient temperature and allowed to crystallise during one week. The mixture is filtered, and the solid is retained. The filtrate is evaporated to dryness, the residue is stirred with dilute sodium hydroxide and diethyl ether. The ethereal phase is separated, washed with water, dried and evaporated to give the partially resolved mixture used in the first part of this example.

The solid retained above (44 g.) is the acid salt of (+)-1-(o-ethoxyphenoxy)-3-isopropylaminopropan-2-ol and (−)-0,0-di-p-toluoyltartaric acid, m.p. 141°C. This is crystallised from ethanol and converted into (+)-1-(o-ethoxyphenoxy)-3-isopropylaminopropan-2-ol, m.p. 73°C. [hydrochloride has $[\alpha]_D^{25} + 17.1°$ ($c = 5$, methanol)].

EXAMPLE 6

34.5 Grams (0.125 mol.) of a partially resolved mixture of the enantiomers of α-[4-(p-chlorophenyl)phenoxy]propionic acid in which the (+)-enantiomer is present in excess, $[\alpha]_D + 9°$ ($c = 5$, methanol), are stirred for 3 hours with a solution of 27 ml. of n-butanol (10 mol. per mol. of (+)-enantiomer) in 1,500 ml. of petroleum ether (b.p. 60°–80°C.). The mixture is filtered to give, as the solid residue, 27 g. of α-[4-(p-chlorophenyl)phenoxy]propionic acid, $[\alpha]_D^{25} + 4.4°$ ($c = 5$, methanol). The filtrate is evaporated to dryness, and the residue is washed with petroleum ether (b.p. 60°–80°C.). The soild residue consists of 5.6 g. of (+)-α-[4-(p-chlorophenyl)phenoxy]propionic acid, m.p. 153°C., $[\alpha]_D + 37.8°$ ($c = 5$, methanol).

The partially resolved mixture used as starting material may be obtained as follows:

A mixture of 51 g. (0.18 mol.) of (+)-α-[4-(p-chlorophenyl)-phenoxy]propionic acid, 11.2 g. of (−)-α-methylbenzylamine (0.09 mol.) and 380 ml. of ethanol is warmed on a steam bath to obtain a clear solution. The solution is cooled to ambient temperature and allowed to crystallise during 4 days. The mixture is filtered and the solid is retained. The filtrate is evaporated and the residue is stirred with dilute hydrochloric acid and diethyl ether. The ethereal phase is separated, washed with water, dried and evaporated to give the partially resolved mixture used in the first part of this example.

The solid retained above is the (−)-α-methylbenzylamine salt of (−)-α-[4-(p-chlorophenyl)phenoxy]propionic acid. After one crystallisation from ethanol it is pure and has m.p. 200°C. The salt is stirred with N-hydrochloric acid and ether. The ethereal phase is separated, washed with water, dried and evaporated. The residue is (−)-α-[4-(p-chlorophenyl)phenoxy]propionic acid, m.p. 153°C. $[\alpha]_D^{25} - 37.8°$ ($c = 5$, methanol).

What we claim is:

1. A process for the isolation of (+)-propanolol from a partially resolved mixture of the enantiomers of propranolol in which (+)-propranolol is present in excess, which comprises the interaction of the said partially resolved mixture with a non-polar solvent in the presence of a solubilising agent selected from primary aralkyl or aliphatic amines, or aliphatic alcohols, and then recovering the (+)-propranolol from the solution so obtained.

2. A process as claimed in claim 1 wherein the non-polar solvent is petrol or cyclohexane and the solubilising agent is benzylamine, or a primary aliphatic amine or aliphatic alcohol each of up to 4 carbon atoms.

3. A process as claimed in claim 1 wherein the partially resolved mixture of the enantiomers of propranolol is obtained by the fractional crystallisation of the neutral diastereoisomeric salts formed from (+)-propranolol and (−)-0,0-di-p-toluoyltartaric acid or (−)-0,0-dibenzoyltartaric acid.

4. A process as claimed in claim 1 wherein the nonpolar solvent is petroleum ether and the solubilising agent is benzylamine.

* * * * *